Sept. 17, 1968            L. G. KILMER            3,401,769
UNDERWATER GAS EXPLOSION SEISMIC WAVE GENERATOR
Filed April 22, 1966                    2 Sheets-Sheet 1
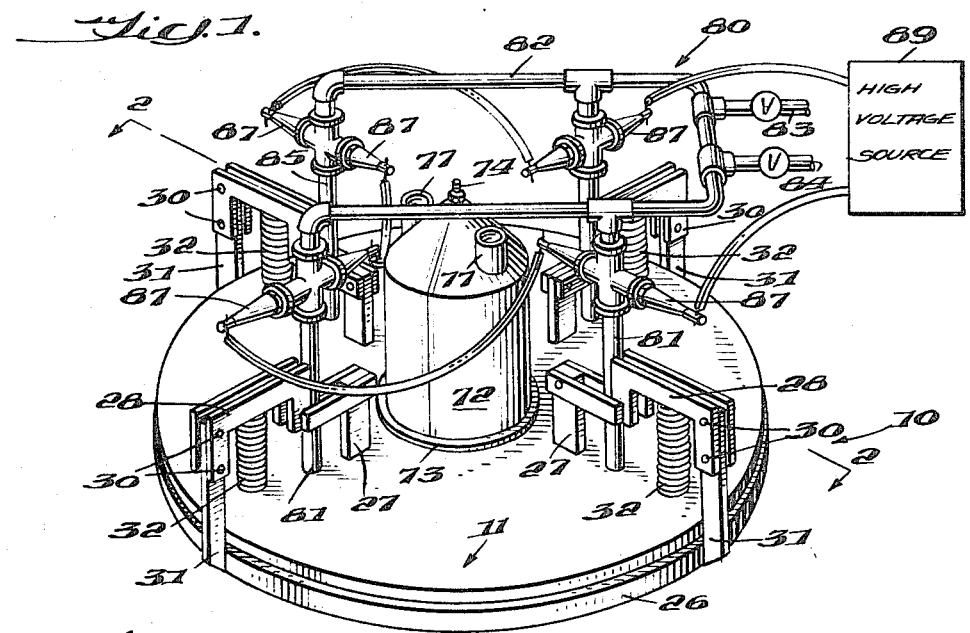
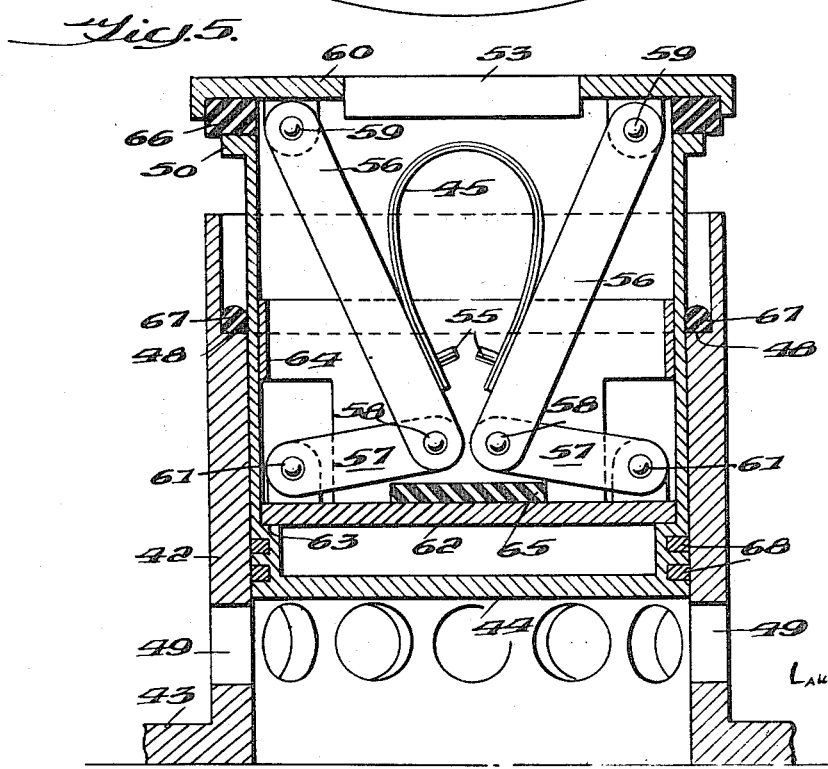
INVENTOR
Lauren G. Kilmer
BY McLean, Morton and Boustead
ATTORNEY

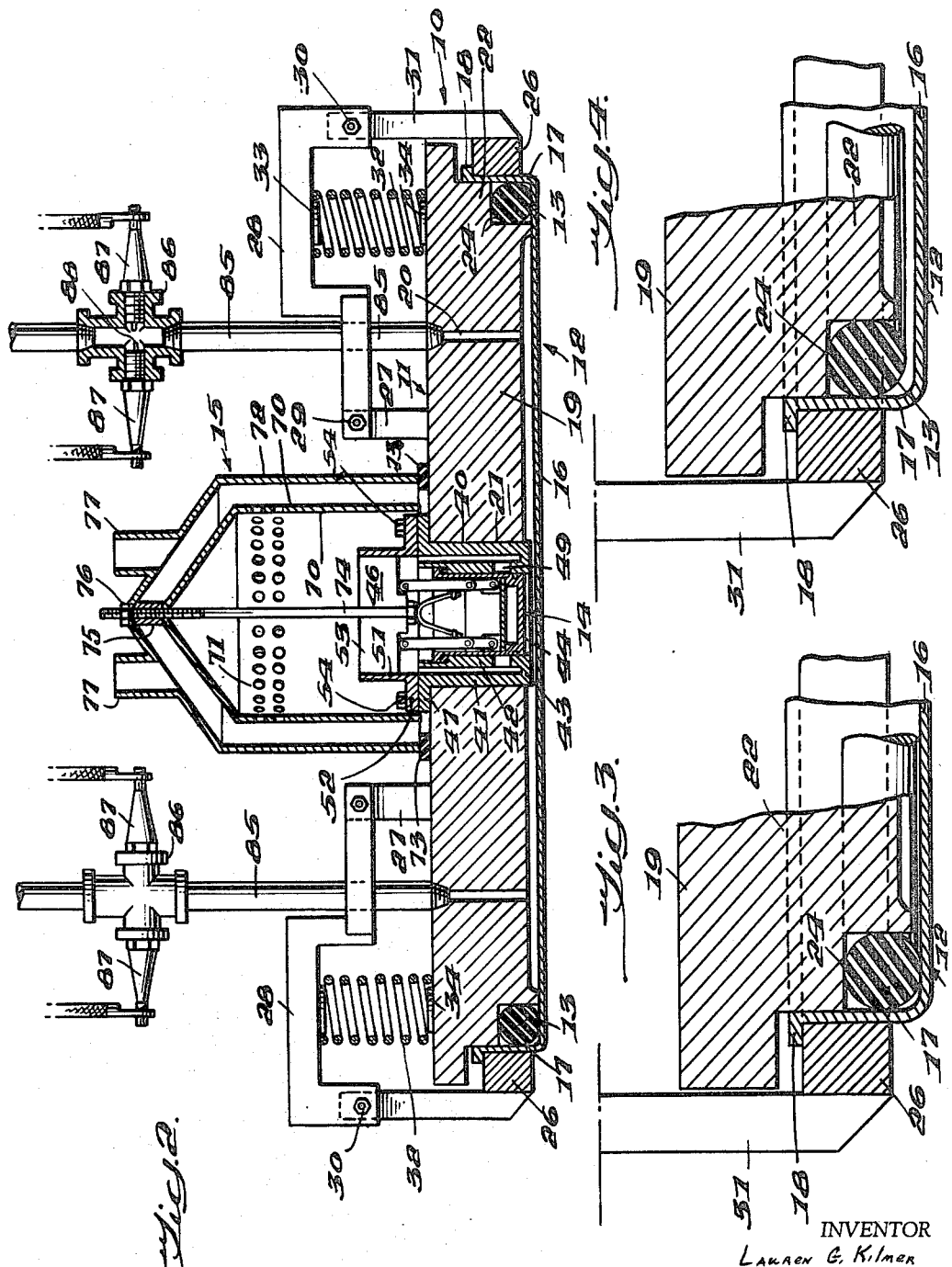

United States Patent Office 3,401,769
Patented Sept. 17, 1968

3,401,769
UNDERWATER GAS EXPLOSION
SEISMIC WAVE GENERATOR
Lauren G. Kilmer, Tulsa, Okla., assignor, by mesne assignments, to Sinclair Research, Inc., New York, N.Y., a corporation of Delaware
Filed Apr. 22, 1966, Ser. No. 544,442
8 Claims. (Cl. 181—.5)

ABSTRACT OF THE DISCLOSURE

A highly effective gas exploder or impulse generator for underwater use having a rigid top and a rigid bottom which when at rest are so constructed as to form a chamber between them in which a gas explosion can take place but which are joined together such that relative vertical separating movement can take place between them. Such vertical movement is, however, also limited by a resilient fastening holding the top and bottom biased together. Internally a dynamic seal is provided positioned on the inner side of and adjacent the clearances at the joint between the top and bottom of the gas exploder. Also, in order that the resilient fastening which biases the top and bottom of the exploder together be not overly strained, a valving arrangement is employed to release the force of the exploded gas simultaneously as relative movement between the top and bottom of the exploder occurs.

---

This invention relates to geophysical prospecting and in particular provides a device for imparting an underwater impulse forming a seismic signal.

As water-covered areas of the earth have been explored for oil bearing formations, efforts have been made to apply the dry land techniques of seismic surveying and while satisfactory results have been obtained, much has been left to be desired in reducing the cost of an operation which is highly expensive even under favorable conditions.

In devices for producing a seismic wave for underwater geophysical prospecting heretofore devised it has been the usual practice to employ a quantity of explosive material such, for example, as dynamite and nitro carbo nitrate, contained within a cartridge or casing and fired beneath the water in predetermined spaced relation with respect to the seismic spread. Such devices possess several disadvantages, one of which, obviously, is the necessity for replacement of the explosive cartridge after each shot and the problems incident to establishing a firing circuit to each of the cartridges in successive order whenever another cartridge is to be fired. Such an arrangement is costly in operation particularly when a large number of shots are to be fired. Furthermore, when the explosive shot emanates from a point source as is the case with the explosive cartridge arrangement, the efficiency of the generated wave is low for the reason that the rate of changes of pressure and the duration of the pressure peak do not correspond to the frequency most favorable to seismic wave propagation. It has been found necessary in the use of these prior devices to employ relatively large quantities of explosives to effect deep penetration of the seismic wave within the subaqueous geological formation by reason of the undesired frequencies and inefficient character of the wave thus produced.

As described in the co-pending Kilmer applications Ser. No. 187,111, filed Apr. 12, 1962, now U.S. Patent 3,235,027, and Ser. No. 314,230, filed Oct. 7, 1963, now U.S. Patent 3,314,497, a gas explosion confined in an expansible chamber acting at the earth-air interface against a large mass positioned above such gas explosion can be utilized to impart a compressive impulse to the surface of the earth beneath the gas explosion thereby initiating a seismic wave. If the explosion is confined in a device having a rigid top (carrying the weight of the large mass) and rigid bottom with vertically extensible sidewalls, the seismic wave generated is useful for seismic prospecting by refraction and reflection techniques, since the impulse imparted to the surface of the earth has a high energy content and can be made of extremely short duration.

In accordance with the present invention, it has been found that such a gas explosion can be used to create an underwater impulse forming a seismic signal. While in the land used devices of the copending Kilmer applications the chamber in which the explosion is confined is vented the moment vertical extension of the sidewalls occurs, it is apparent that the pressure of the water presents problems in underwater impulse generators not experienced with land used devices.

With these precepts in mind it has now been found that a highly effective gas exploder or impulse generator for underwater use can be provided having a rigid top and a rigid bottom which when at rest are so constructed as to form a chamber between them in which a gas explosion can take place but which are joined together such that relative vertical separating movement can take place between them. Such vertical movement is, however, also limited by a resilient fastening holding the top and bottom biased together. Internally a dynamic seal is provided positioned inside of and adjacent the clearances at the joint between the top and bottom of the gas exploder. Also, in order that the resilient fastening which biases the top and bottom of the exploder together be not overly strained, a valving arrangement is employed to release the force of the exploded gas simultaneously as relative movement between the top and bottom of the exploder occurs. This is also desirable particularly where several explosions are required at a given location.

For a more complete understanding of the practical application of my invention, reference is made to the appended drawings in which:

FIGURE 1 is an isometric view of a gas exploder constructed in accordance with my present invention;

FIGURE 2 is a vertical section taken at line 2—2 in FIGURE 1;

FIGURE 3 is an enlarged fragmentary view of a portion of the device as seen in FIGURE 2;

FIGURE 4 is a view similar to FIGURE 3 illustrating the operation of the seal of the present invention; and FIGURE 5 is an enlarged fragmentary view illustrating the operation of the valve of the present invention.

Referring more particularly to FIGURES 1 and 2 the reference number 10 deisgnates a gas exploder constructed in accordance with my present invention. Gas exploder 10 basically includes a top 11, a bottom 12, a sealing ring 13, a valve 14 and an exhaust stack 15.

Referring also to FIGURES 3 and 4 bottom 12 includes a circular steel plate 16 which at its rim is provided with an integral, upstanding cylindrical flange 17 which at its upper end carries an integral, outwardly-extending, short, annular flange 18.

Top 11 includes an annular, thick-steel plate 19 having an outside diameter slightly larger than the outside diameter of flange 18 and is further provided with four small, tapped, vertical openings 20 disposed at 90° intervals about plate 19 approximately midway between its central opening 21 and its rim. The lower portion 22 of plate 19 is approximately of the same height as flange 17 on bottom plate 16 and has an outside diameter slightly less than that of flange 17 such that top plate 19 can be positioned coaxially over bottom plate 16 with portion 22 inside flange 17 and spaced slightly inward of flange 17. Portion 22 of plate 19 is stepped inwardly at its lower, outer edge to form an annular seat 24 sized to receive O-ring 13.

Referring particularly to FIGURE 3 it will be noted that sealing ring 13, which is made of chloroprene rubber, is positioned resting on the top of bottom plate 16 just inside flange 17 such that seat 24 rests on it. Preferably the thickness of ring 13 is sufficient that the bottom of plate 19 slightly clears the top of bottom plate 16 and the sides of ring 13 are just tangent to the side of plate 19 below seat 24 and the inner side of flange 17.

Bottom 12 and top 11 are retained together by means of a metal hoop 26 positioned encircling flange 17. Upstanding members 27 secured to the plate 19 adjacent muffler 15 are operatively connected to hoop 26. Each member 27 has a cross bar 28 pivotally connected at 29 to member 27 and also at 30 to a bar 31 which is secured to hoop 26. Hoop 26 has an outer diameter sufficient to extend outwardly of plate 19 so that plate 19 can freely move inside bars 31. A spring 32 is arranged between spring supports 33 and 34 attached, respectively, to bar 28 and top plate 19. Springs 32 are sized to prevent plate 19 from coming out of bottom 12 and cushion movement between bottom 12 and top 11.

Valve 14 includes a valve body 40, a piston (valve element) 44, a spring 45 and a spring retainer means 46. Generally valve body 40 includes a pair of coaxial cylindrical walls 41 and 42, which are spaced from each other, are closed together at their lower ends by means of an interconnecting annular end wall 43 and are open at their upper ends. The outer sidewall 41 at its upper end is provided with an outwardly extending annular flange 47 and itself has a diameter just less than that of opening 21 such that valve body 40 can be positioned in opening 21 with flange 47 overlying the top of plate 19. Inner wall 42 has a machined inside surface which is counter-sunk at its upper end to provide a seat 48 and is provided with a series of apertures 49 adjacent its lower end providing communication between the annular space between walls 41 and 42 and the central opening of valve body 40 lying inside wall 42.

Piston 44 is a machined casting sized to fit snugly but slidingly within cylindrical wall 42 and has a flange 50 at its upper end received in the seat 48 to limit downward movement of piston 44 at a position in which the lower, closed end of piston 44 is flush with the underside of plate 19 when piston 44 is dropped into the central opening of valve body 40 from its upper ends.

Spring retainer means 46 includes a short steel cylinder 51 which has an outwardly projecting, annular flange 52 at its lower end and a pair of intersecting steel crossplates in its upper interior portion forming a spider 53. The cylindrical portion 51 has the same inside diameter as sidewall 41 of valve body 40 and is positioned above valve body 40 with annular flange 52 overlying flange 47. Cylinder 51 is retained in such position by a series of cap bolts 54 received in apertures in flanges 47 and 52 which register with correspondingly disposed tapped bores about opening 21 in plate 19. The spring 45 is a leaf type spring secured by elements 55 to two knuckle joints each formed by two links 56 and 57 pivotally connected together at 58. Links 56 are pivotally connected at 59 to a plate 60 held against or secured to spider 53. Links 57 are pivotally connected at 61 to a plate 62 which rests on a seat 63 machined in piston 44. Spring 45 normally biases each knuckle joint outwardly and tends to straighten the joints. A sleeve 64 is arranged on plate 62 to prevent the joints from completely straightening out.

FIGURE 5 illustrates the open position of the value to demonstrate operation thereof. In this position the valve piston 44 is raised against the pressure of spring 45 to open apertures 49 which are in communication with the space between top 11 and bottom 12 of the exploder. As the knuckle joint links 57 are raised, the joints 58 are bent inwardly and leaf spring 45 is bowed. Spring 45 in its bowed position applies a force which tends to straighten out the knuckle joints and push downwardly on plate 62 and piston 44. Since sleeve 64 prevents the knuckle joints from straightening out, they are always bowed slightly inwardly assuring operation of the valve. Resilient pad 65 on plate 62 cushions the knuckle joints when they are bent during opening of valve 14. A resilient ring 66 is also attached to plate 60 for cushioning flange 50 during opening of valve 14 and an O-ring 67 is arranged in seat 48 for cushioning flange 50 during closing of valve 14 positions. Piston rings 68 seal the lower end of piston 44.

Muffler 15 includes an open-ended cylinder 70 which at its open, lower end is fitted over the upper end of cylinder 51 and flange 52 and which is provided with lateral openings 71 about its upper, closed end to permit venting of gases passing upwardly through valve 14 into a second hollow open-ended cylinder 72 which fits over cylinder 70 and rests on a rubber or other resilient sealing strip 73 on top 11, i.e., plate 19, of the chamber. The cylinders 70 and 72 are held in place by bolt 74 which is secured to spider 53. A spacer sleeve 75 holds cylinder 70 in position and nut 76 tightens cylinder 72 against strip 73. Cylinders 70 and 72 can be permanently attached to spacer 75. Two pipe connectors 77 are attached to the upper portion of cylinder 72 and provide for attachment thereto of pipes which extend to the surface of the water when the exploder is used underwater. In operation, the cylinders 70 and 72 act as a plenum chamber so that combustion gases from the exploder 10 may slowly exhaust to the atmosphere between explosions.

Referring to FIGURES 1 and 2 gas exploder 10 further requires a gas charging and ignition system generally designated by the reference number 80. Charging and ignition system 80 basically includes four upstanding conduits 81 interconnected at their upper ends through a header 82 to separate valved connections 83 and 84 leading to storage cylinders respectively for propylene, or other suitable combustible gas, and for oxygen.

Each upstanding conduit 81 includes a pipe section 85 threadedly received at its lower end in a tapped aperture 20 in plate 19 and, threadedly received on the upper end of such pipe section 81, a four-way fitting 86. Header 82 generally includes suitable nipples, elbows and T's as well as pipe sections to provide a U-shaped connection communicating the upper openings of four-way fittings 86 with valved conduits 83 and 84 which are preferably connected to the bottom of the U.

Eight spark plugs 87 having their ground electrodes removed, two to each four-way fitting 86, in the lateral openings of fittings 86 such that, as shown most clearly in FIGURE 2, the insulated electrodes 88 of each thusly asociated pair of plugs 87 face each other in such fitting 86. Exteriorly eight spark plugs 87, thus mounted, are electrically connected in series across a suitable electrical supply 89 which is capable of impressing a high voltage, typically on the order of 70,000 volts, across serially interconnected spark plugs 87 at any desired instant in time.

In operation gas exploder 10 is located at a suitable location with bottom 12 resting beneath the surface of a body of water at a desired depth, e.g., up to 50 or more feet, with pipes connected from pipe connectors 77 to the surface of the water. Typically the force of spring 45 is sufficient such that operation of piston 44 does not occur until a pressure within exploder 10 on the order of 30 p.s.i.g. has been reached.

Valved conduits 83 and 84 are then opened to admit propylene and oxygen until a pressure in exploder 10 on the order of 2 p.s.i.g. has been achieved. (It will be apparent that a stoichiometric mixture of oxygen and propylene are sought and that this is achieved quite simply by introducing the gases such that the partial pressures of each are in proportion to the molar ratio of a stoichiometric mixture, i.e., $4.5:1::O_2:C_3H_6$.)

With valved conduits 83 and 84 closed, exploder 10 is properly charged and an explosion can be initiated simply by actuating high voltage source 89 at the desired point in time, whereupon high potential is placed across the serial connection of the eight spark plugs 87. It will be apparent that in the event of any fouling of spark plugs 87 at least two active gaps from an electrode 88 to ground or another electrode 88 are nevertheless provided such that combustion of the mixture of gases within exploder 10 is initiated with a resultant explosion occurring substantially simultaneously with energization of plugs 87.

Noting FIGURE 3, which shows a section through seal 13 and the surrounding structure of gas exploder 10, when exploder 10 is charged the cross-section of sealing ring 13 is of substantially circular shape and the surfaces of flange 17, of plate 16 and of lower portion 22 of plate 19, are tangent to the exterior of ring 13. Upon explosion of the gases, the initial force of the explosion is directed against bottom 12 due to the larger mass of top 11 to create the seismic wave of interest. The continued expansion of the exploding gases drives the bottom 12 downwardly relative to top 11 since bottom 12 is relatively considerably lighter than top 11 tending to compress resilient spring 32, which can so yield, although in a limited manner, as described above. At such time the pressure of the exploding gases forces sealing ring 13 tightly against the joint formed between the flange 17 and portion 22, as indicated in FIGURE 4, generally deforming ring 13 against such joint.

At the same time as relative movement of the bottom 12 and top 11 occurs, however, piston 44 is lifted at even faster rate to vent the interior of gas exploder 10 through valve 14 and muffler 15, see FIGURE 5. This vent action is so rapid that normally the pressure is relieved within a fraction of a second. Generally after such collapse, which collapse is cushioned by sealing ring 13, the pressure of unvented combustion gases remaining between top 11 and bottom 12 is substantially negative to atmospheric, being on the order of five p.s.i.a. Usually as a result, it is unnecessary in subsequent firing to purge the interior of gas exploder 10 when recharging, and recharging is so fast that repetitive firing at significantly rapid rates is feasible. Top 11 and bottom 12 are closed after an explosion by several forces including springs 32, the weight of top 11 and hydrostatic pressure. Closure of valve 14 through the action of toggles is timed to provide for exhaust of chamber A.

The source of this invention can also be used on the surface of the ground to impart an impulse forming a seismic signal.

I claim:

1. A sound source for propagating a seismic wave including means defining a closed chamber having a rigid bottom and rigid top including at least a portion telescoping into said bottom and forming a joint between said top and bottom and their sides having clearances therebetween; a resilient sealing ring disposed between said top and bottom on the inner side of said joint positioned against the clearances thereof to seal said chamber; fastening means for attaching said bottom to said top and permitting vertical movement between said bottom and said top including spring means on said top for limiting said movement; gas charging and igniting means including conduit means positioned above said top and connected thereto to provide external communication to said chamber; and exhaust means including means defining an opening in said top adapted to provide external communication from the atmosphere to said chamber and a valve body having two concentric spaced apart co-axial walls closed together at their one ends by an interconnecting annular wall and open at their other ends, said valve body being inserted into said opening with said annular wall facing said chamber, the inner wall of said two co-axial walls having at least one aperture therethrough, a valve piston slidably and sealingly arranged within said inner wall, two knuckle joints each pivotally secured at one end operatively to said piston and at the other end to a stationary part secured to said top, and spring means tending to straighten said knuckle joints, said knuckle joints in their straightened position forcing said valve piston to seal said aperture and in their bowed position moving said valve piston to connect said aperture to said chamber.

2. An underwater sound source according to claim 1 wherein said gas charging and igniting means includes conduit means positioned above said top having a plurality of connections thereto to provide external communication to said chamber at a plurality of spaced points, insulated electrode pairs positioned in said conduit means to define a plurality of spark gaps therein, and means interconnecting said electrodes whereby said spark gaps are electrically connected in series.

3. An underwater sound source according to claim 1, wherein said fastening means comprises a retaining ring fitted about said bottom underneath a flange on said bottom and at least one means for securing said ring to said top including a first member secured to said top inwardly of the rim thereof, a cross bar pivotally attached at one end to said member and extending outwardly of said rim and a second member connecting said ring and said cross bar, said spring means including a spring fastened to said cross bar and to said top between said first and second members.

4. An underwater sound source according to claim 1 wherein said exhaust means includes muffler means sealingly secured to said top over said opening and conduit means providing communication between said muffler and the atmosphere.

5. A sound source for propagating a seismic wave including means defining a closed chamber having a rigid bottom and rigid top including at least a portion telescoping into said bottom and forming a joint between said top and bottom at their sides having clearances therebetween; a resilient sealing ring disposed between said top and bottom on the inner side of said joint positioned against the clearances thereof to seal said chamber; a retaining ring fitted about said bottom underneath a flange on said bottom; at least one means for securing said retaining ring to said top including a first member secured to said top inwardly of the rim thereof, a cross bar pivotally attached at one end to said first member and extending outwardly of said rim, a second member connecting said retaining ring and said cross bar, and a spring fastened to said cross bar and to said top between said first and second members; gas charging and igniting means including conduit means positioned above said top and connected thereto to provide external communication to said chamber; and exhaust means including means defining an opening in said top adapted to provide external communication from the atmosphere to said chamber and normally closed valve means positioned in said opening to close said communication therethrough and operable upon a predetermined increase in pressure in said chamber to open thereby communicating said chamber with the exterior of said device.

6. A sound source as claimed in claim 5 wherein said exhaust valve comprises a valve body having two concentric spaced-apart co-axial walls closed together at their one ends by an interconnecting annular wall and open at their other ends, said valve body being inserted into said opening with said annular wall facing said chamber, the inner wall of said two co-axial walls having at least one aperture therethrough, a valve piston slidably and sealingly arranged within said inner wall, two knuckle joints each pivotally secured at one end operatively to said piston and at the other end to a stationary part secured to said top, and spring means tending to straighten said knuckle joints, said knuckle joints in their straightened position forcing said valve piston to seal said aperture and in their bowed position moving said valve piston to connect said aperture to said chamber.

7. A sound source as claimed in claim 5 wherein said exhaust means includes muffler means sealingly secured to said top over said opening and conduit means providing communication between said muffler and the atmosphere.

8. A sound source as claimed in claim 5 wherein said gas charging and igniting means includes conduit means positioned above said top having a plurality of connections thereto to provide external communication to said chamber at a plurality of spaced points, insulated electrode pairs positioned in said conduit means to define a plurality of spark gaps therein, and means interconnecting said electrode pairs whereby said spark gaps are electrically connected in series.

References Cited

UNITED STATES PATENTS

| 1,753,368 | 4/1930 | DuBois-Reymond et al. | 181—0.5 |
|---|---|---|---|
| 3,056,104 | 9/1962 | Dekanski et al. | 181—0.5 |
| 3,099,813 | 7/1963 | Anderson | 181—0.5 |
| 3,198,282 | 8/1965 | Dunaway | 181—0.5 |
| 3,260,327 | 7/1966 | McCollum | 181—0.5 |
| 3,276,534 | 10/1966 | Ewing et al. | 181—0.5 |
| 3,289,784 | 12/1966 | Cassand et al. | 181—0.5 |
| 3,292,140 | 12/1966 | Angona et al. | 340—7 |
| 3,310,128 | 3/1967 | Chelminski | 181—0.5 |
| 3,176,787 | 4/1965 | Roever | 340—7 X |
| 3,256,501 | 6/1966 | Smith | 340—7 |

BENJAMIN A. BORCHELT, *Primary Examiner.*

W. KUJAWA, *Assistant Examiner.*